United States Patent
De Lima Junior et al.

(10) Patent No.: US 10,997,289 B2
(45) Date of Patent: May 4, 2021

(54) IDENTIFYING MALICIOUS EXECUTING CODE OF AN ENCLAVE

(71) Applicant: INTERNATIONAL BUSINESS MACHINES CORPORATION, Armonk, NY (US)

(72) Inventors: Juscelino Candido De Lima Junior, Sao Paulo (BR); Breno H. Leitao, Araraquara (BR); Camilla Ogurtsova, Sao Paulo (BR); Marcel de Toledo Pineda, Santo Andre (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 148 days.

(21) Appl. No.: 15/984,817

(22) Filed: May 21, 2018

(65) Prior Publication Data
US 2019/0354680 A1    Nov. 21, 2019

(51) Int. Cl.
| | | |
|---|---|---|
| G06F 21/55 | (2013.01) | |
| G06F 21/53 | (2013.01) | |
| G06N 5/02 | (2006.01) | |
| G06F 11/34 | (2006.01) | |
| G06F 16/28 | (2019.01) | |

(52) U.S. Cl.
CPC ........ G06F 21/552 (2013.01); G06F 11/3485 (2013.01); G06F 16/285 (2019.01); G06F 21/53 (2013.01); G06F 21/554 (2013.01); G06N 5/02 (2013.01); G06F 2201/81 (2013.01); G06F 2201/865 (2013.01)

(58) Field of Classification Search
CPC .............................. G06F 21/552; G06F 21/554
USPC ........................................................... 726/22
See application file for complete search history.

(56) References Cited

U.S. PATENT DOCUMENTS 7,712,143 B2   5/2010   Comlekoglu
8,578,477 B1   11/2013  Lin et al.
(Continued)

OTHER PUBLICATIONS

"A Hybrid Model to Detect malicious Executable," by Masud, M. Mohammed, Khan, Latifur, Thuraisingham, Bhavani; IEEE Communication Society, for IEEE publication, ICC 2007. (Year: 2007).*
(Continued)

*Primary Examiner* — Dant B Shaifer Harriman
(74) *Attorney, Agent, or Firm* — William Hartwell; Matthew M. Hulihan; Heslin Rothenberg Farley & Mesiti PC (57) ABSTRACT

Identifying malicious code execution of executing subject code of a software enclave of a processing system follows a process that includes monitoring performance characteristics of the processing system attributed to execution of the subject code of the software enclave. The monitoring produces performance data, which is stored to a relational database. The process applies a classification model to the stored performance data to obtain an output, and, based on the output of the classification model, identifies anomalous behavior in the execution of the subject code and determines a confidence level that the anomalous behavior exhibits malicious activity. Based on the confidence level exceeding a threshold, the process determines that the executing subject code is malicious and initiates halting of the execution of the subject code.

19 Claims, 7 Drawing Sheets

(56) References Cited

U.S. PATENT DOCUMENTS

| | | | | |
|---|---|---|---|---|
| 9,552,481 | B1* | 1/2017 | Guo | G06F 21/53 |
| 10,135,633 | B2* | 11/2018 | von Gravrock | G06F 21/566 |
| 10,264,104 | B2* | 4/2019 | Katmor | H04L 63/0263 |
| 2008/0077994 | A1* | 3/2008 | Comlekoglu | G06F 21/53 |
| | | | | 726/27 |
| 2014/0123280 | A1* | 5/2014 | Kedma | G06F 21/56 |
| | | | | 726/23 |
| 2016/0006754 | A1 | 1/2016 | Woodward et al. | |
| 2016/0180090 | A1 | 6/2016 | Dalcher et al. | |
| 2016/0275289 | A1 | 9/2016 | Sethumadhavan et al. | |
| 2017/0090929 | A1* | 3/2017 | Muttik | G06F 21/562 |
| 2019/0041957 | A1* | 2/2019 | Hunt | G06F 1/3296 |
| 2019/0303562 | A1* | 10/2019 | Masputra | G06F 16/2365 |

OTHER PUBLICATIONS

Schwarz, M., et al., "Malware guard extension: using SGX to conceal cache attacks (extended version)", https://arxiv.org/pdf/1702.08719.pdf, Mar. 1, 2017, 16 pgs.

Weiser, S., et al., "SGXIO: generic trusted I/O path for Intel SGX", https://arxiv.org/pdf/1701.01061.pdf, Jan. 4, 2017, 12 pgs.

Davenport, S., et al., "SGX: the good, the bad and the downright ugly", [retrieved on Feb. 27, 2018]. Retrieved from Internet URL: <https://www.virusbulletin.com/virusbulletin/2014/01/sgx-good-bad-and-downright-ugly/>, Virus Bulletin, Jan. 7, 2014, 8 pgs.

"SGX Secure Enclaves in Practice: Security and Crypto Review", [retrieved on Feb. 27, 2018]. Retrieved from Internet URL: <https://github.com/kudelskisecurity/sgxfun/blob/master/paper/sgxpaper.md>, Aug. 1, 2016, 6 pgs.

Mell, Peter, et al., "The NIST Definition of Cloud Computing", NIST Special Publication 800-145, Sep. 2011, Gaithersburg, MD, 7 pgs.

"My Journey on Technology Road" [retrieved on May 9, 2018]. Retrieved from Internet URL: <https://trungvo.wordpress.com/2009/02/09/my-research-on-fast-multi-pattern-search-algorithms/>, Feb. 9, 2009, 3 pgs.

Norton, M., "Optimizing Pattern Matching for Intrusion Detection", Jul. 2004, 11 pgs.

\* cited by examiner

IDENTIFYING MALICIOUS EXECUTING CODE OF AN ENCLAVE

BACKGROUND

Software enclaves provide a technology for application developers seeking to protect select code and data from disclosure or modification. Software, for instance user-level code, is allocated a memory region protected from view from processes running at even higher privilege levels, thus the enclave can provide a protected area of execution.

SUMMARY

Shortcomings of the prior art are overcome and additional advantages are provided through the provision of a computer-implemented method for identifying malicious code execution of executing subject code of a software enclave of a processing system. The method includes monitoring performance characteristics of the processing system attributed to the execution of the subject code of the software enclave. Monitoring performance characteristics produces performance data, and includes monitoring processor performance in the execution of the subject code, and producing processor performance data based on the monitoring the processor performance, and monitoring input/output (I/O) characteristics, including network I/O characteristics, attributed to the execution of the subject code, and producing I/O performance data based on the monitoring the I/O characteristics. The method stores the performance data to a relational database. The method applies a classification model to the stored performance data to obtain an output. Based on the output of the classification model, the method identifies anomalous behavior in the execution of the subject code and determines a confidence level that the anomalous behavior exhibits malicious activity. Based on the confidence level exceeding a threshold, the method determines that the executing subject code is malicious and initiates halting of the execution of the subject code.

Further, a computer system is provided for identifying malicious code execution of executing subject code of a software enclave of a processing system. The computer system includes a memory and a processor in communication with the memory, wherein the computer system is configured to perform a method. The method includes monitoring performance characteristics of the processing system attributed to the execution of the subject code of the software enclave. Monitoring performance characteristics produces performance data, and includes monitoring processor performance in the execution of the subject code, and producing processor performance data based on the monitoring the processor performance, and monitoring input/output (I/O) characteristics, including network I/O characteristics, attributed to the execution of the subject code, and producing I/O performance data based on the monitoring the I/O characteristics. The method stores the performance data to a relational database. The method applies a classification model to the stored performance data to obtain an output. Based on the output of the classification model, the method identifies anomalous behavior in the execution of the subject code and determines a confidence level that the anomalous behavior exhibits malicious activity. Based on the confidence level exceeding a threshold, the method determines that the executing subject code is malicious and initiates halting of the execution of the subject code.

Yet further, a computer program product including a computer readable storage medium readable by a processor and storing instructions for execution by the processor is provided for performing a method for identifying malicious code execution of executing subject code of a software enclave of a processing system. The method includes monitoring performance characteristics of the processing system attributed to the execution of the subject code of the software enclave. Monitoring performance characteristics produces performance data, and includes monitoring processor performance in the execution of the subject code, and producing processor performance data based on the monitoring the processor performance, and monitoring input/output (I/O) characteristics, including network I/O characteristics, attributed to the execution of the subject code, and producing I/O performance data based on the monitoring the I/O characteristics. The method stores the performance data to a relational database. The method applies a classification model to the stored performance data to obtain an output. Based on the output of the classification model, the method identifies anomalous behavior in the execution of the subject code and determines a confidence level that the anomalous behavior exhibits malicious activity. Based on the confidence level exceeding a threshold, the method determines that the executing subject code is malicious and initiates halting of the execution of the subject code.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

For better or worse, architecture vendors do not give the option for trusted entities, such as vendors of anti-malware (synonymously referred to as antivirus herein), software access to the content of a software enclave, for instance for purposes of scanning the content of the enclave to determine whether software executing in the enclave is malicious. In principle, then, a malicious actor might create an enclave to prevent the operating system, hypervisor, anti-malware, or other software from directly viewing malware that is executing. Coupled with ubiquitous connectivity, this could cause problems, for instance small loaders could download sophisticated packages of malware remotely via an encrypted link.

Described herein are approaches for detecting malicious code running in an enclave. As noted, by design an enclave encrypts memory, rendering it unreadable to other applications, such as anti-malware programs, and potentially even a hypervisor on which the enclave executes. Enclaves can therefore serve as a useful tool for malware exploits.

Figure 1:
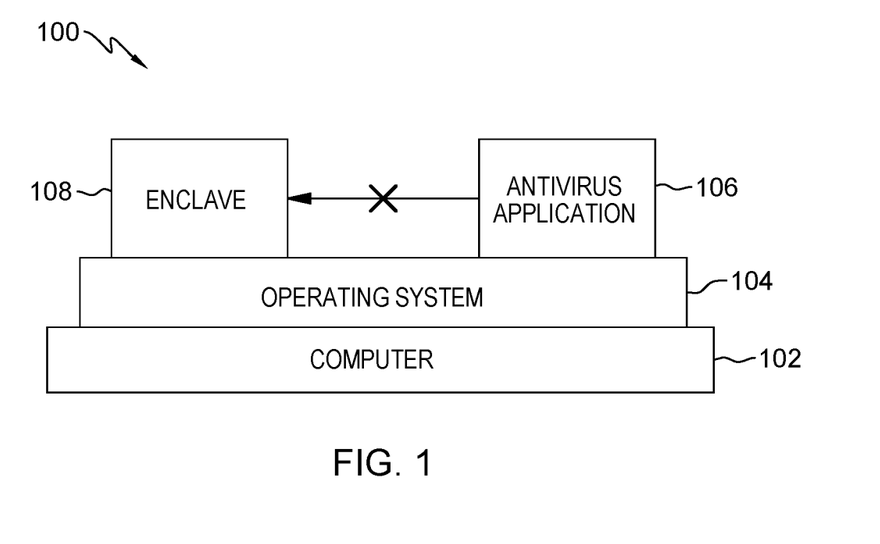
FIG. 1 depicts an example of a computer system in which an antivirus program is prevented from reading memory of a software enclave.

FIG. 1 depicts an example of a computer system 100 in which an antivirus program is prevented from reading memory of a software enclave. Computer 102 (e.g. hardware) executes an operating system 104. Antivirus application 106 executes in the operating system 104. The computer also includes enclave 108. Antivirus application 106 reads file signatures and compare the signatures to those in malware definitions to detect malware. However, as illustrated, antivirus application 106 is unable to read the memory (and therefore contents thereof) that is dedicated to enclave 108. By design, the antivirus application 106 will not be able to read the memory because of the protections provided by the enclave technology, for instance encryption of memory content. File signatures are not obtainable and the antivirus application 106 is therefore unable to evaluate the software and other data of the enclave 108.

It is noted that other components, such as a hypervisor and/or ultravisor, not shown, may execute on the hardware 102. In particular environments, neither the operating system 104 nor a hypervisor is able to access enclave contents. Though in some architectures an ultravisor layer (executing on the bare metal for example) may be able to read enclave content, architecture protections typically prevent any anti-malware software from accessing enclave contents.

Current practices can neither read nor visualize contents at/in the enclave. However, aspects described herein provide an approach for components such as anti-malware programs to detect executing malicious code of a software enclave. As described herein, embodiments can monitor I/O (input/output) and other performance data from multiple operations, programs, and devices to assess whether the behavior exhibited by executing code of the enclave indicates anomalous, and potentially malicious, behavior. Accordingly, provided herein are:

Aspects to detect malware executing in/at the enclave level;

Aspects to detect an enclave workload based on performance counter events;

Aspects that infer an enclave workload based on execution around the enclave, for instance memory allocations, system calls, TCP packet size, and/or disk block size, among other characteristics; and Aspects to remediate malware stored at the enclave level.

Figure 2:
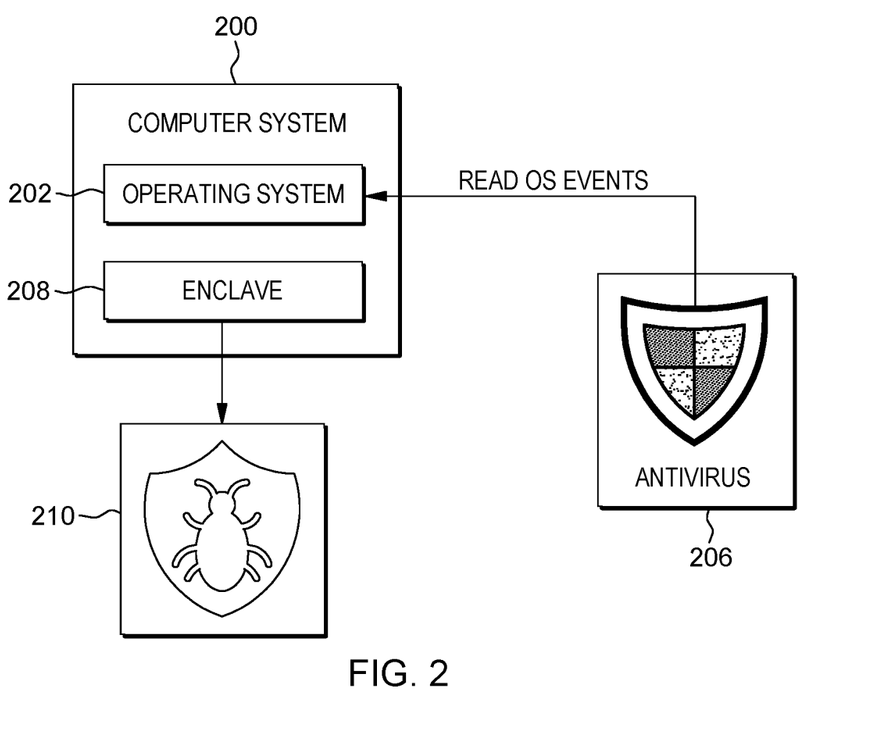
FIG. 2 depicts another example in which an antivirus program is prevented from reading memory of a software enclave.

FIG. 2 depicts another example in which an antivirus program is prevented from reading memory of a software enclave. A computer system 200 with enclave technology enabled runs an operating system 202 and enclave 208. The computer system 200 also executes antivirus software 206 that can read operating system events. However, an attacker has taken advantage of the enclave 208 to store and execute malicious code 210. Antivirus 206 is unable to identify or match to a known virus signature as it has no way to read the enclave's memory (e.g. the contents are encrypted and therefore file signatures are unreadable to the antivirus software).

Figure 3:
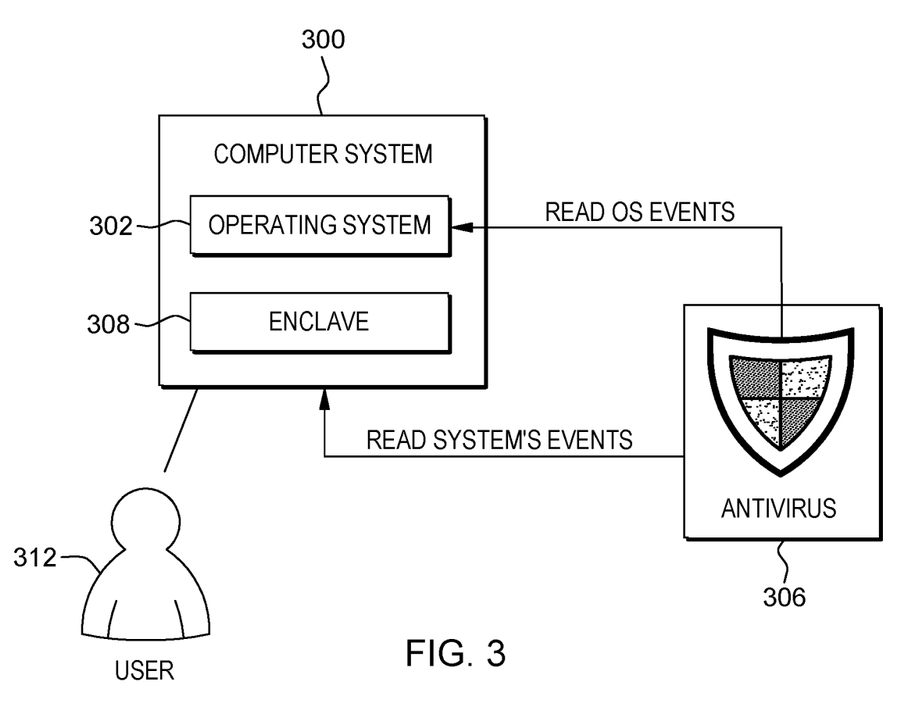
FIG. 3 presents an example implementing a proposed solution in which system events and information are read to identify malicious code execution of executing subject code of a software enclave, in accordance with aspects described herein.

FIG. 3 presents an example implementing a proposed solution in which system events and information are read from the computer system to identify malicious code execution of executing subject code of a software enclave, in accordance with aspects described herein. Here, computer system 300 with enclave technology enabled runs an operating system 302 and enclave 308. Antivirus software 306 reads operating system events as well as system events from the computer system. In this regard, the antivirus software monitors, via the system events, the data input to and output from multiple devices, programs, and systems. Additionally, the antivirus software includes a classification and regression algorithm that identifies anomalies represented by or gleaned from this data. Despite antivirus software 306 being unable to read the enclave data, it monitors I/O and other performance data and relevant activity within the system, analyzes this, and detects what it considers to be anomalies. Based on the anomalies, it can identify malicious behavior if confidence is high enough that the anomalous behavior is actually malicious.

In the example of FIG. 3, antivirus software 306 runs on the computer 300, though in other examples the antivirus software runs on a different machine, for instance one that is remote from computer 300 and in communication with a software agent on computer system 300. The software agent could capture relevant performance data and provide this to the antivirus software 306 for analysis and identification of malicious code execution as described herein.

Antivirus software 306 can parse operating system and other system logs looking for traces of malicious activities that may be originating from or targeted to the enclave. A user 312 of system 300 may be notified in cases of abnormal I/O or other forms of anomalous behavior of the enclave. In some embodiments, the enclave is automatically destroyed when malicious activity is detected.

By way of a particular example, a specific user case sees a user opening a malicious link to instructions that download malicious software code and create an enclave to store it. As soon as the malicious code is deployed at the enclave, the antivirus software observes a newly opened port and multiple connections through that port to an unknown internet protocol (IP) address. The multiple connections are for packets of a size and duration that is unusual. By duration of the packets is meant the stream of packets; some malware will repeatedly and relatively rapidly open a new TCP/IP session, transmit a relatively small amount of data from the system, then close session. This burst of data out to a remote recipient may indicate malicious activity. Cross-checking this observed behavior with a database of historic performance data generated based on monitoring resources may identify anomalous behavior. The database may log historic performance data across any number of different machines and leverage machine learning to identify the above-observed behavior as being anomalous, and potentially (or with high confidence) malicious. Based on the activity being deemed malicious, the antivirus software might request that the processor destroy the enclave. The processor may be configured to respond accordingly, for instance when a trusted program (such as an antivirus program) requests that the enclave be destroyed.

Figure 4:
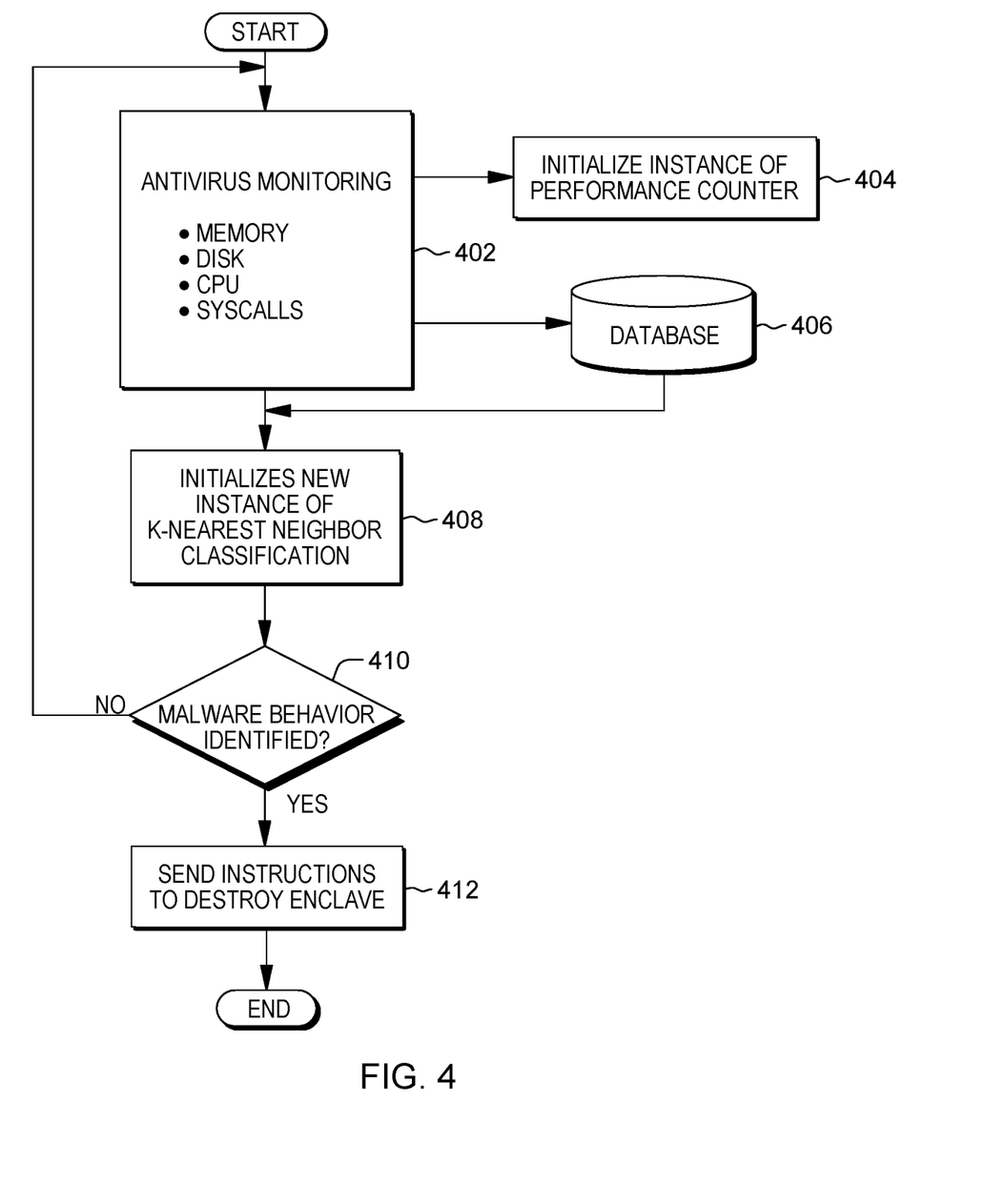
FIG. 4 depicts an example process of monitoring executing subject code of a software enclave, in accordance with aspects described herein.

FIG. 4 depicts an example process of monitoring executing subject code of a software enclave, in accordance with aspects described herein. In some examples, this process is performed by antivirus or other anti-malware software, though the process could be performed by any type of software, whether or not it is considered anti-malware software.

The process starts with the initiation of antivirus software monitoring (402). In this example, the monitoring monitors memory and hardware cache events (such as cache misses), disk events, CPU performance, and system call events, though the antivirus software may be configured to monitor any other relevant information of the computer system. The information/data produced from the monitoring is referred to herein as performance data, and includes, as examples, processor performance data, I/O performance data, and event data.

The monitoring triggers initialization of an instance of the system's performance counter (404) to collect at least some of this performance data. In this regard, central processing units (CPUs) typically feature a performance monitoring unit that exposes to kernel space a set of characteristics about the workload running on the CPU. Cache hits, misses, and other information is collected, and from this, patterns in these monitored events may be observed and correlated to a knowledge base to identify malware. The continuous monitoring by the antivirus software can include monitoring of system devices, virtual memory areas, network statistics, for instance TCP packet size and patterns, disk usage and read/write of block sizes, as examples. Events and other performance data may be stored in a relational database 406.

By aggregating the data from multiple data sources, the process can then use an algorithm for classification and regression, for instance by initializing an instance of a k-nearest neighbor classification algorithm (408). Other approaches for classification/learning are possible. After a training period involving collected performance data from one or more machines, the algorithm is trained to identify anomalies based on, e.g., monitored I/O from/to the enclave. A prediction as to current or potential future malicious activity of executing software code can be based on a confidence level extracted by applying the classification model to the stored performance data. Thus, the process determines whether malware behavior is identified (410). If so, the antivirus software could then request that the enclave be destroyed (412) to therefore stop malicious code execution. Otherwise, the process returns to 402 to iterate the monitoring and assessment.

Patterns and trends identified in performance data can be stored to the database. The database 406 could be a central database to which a plurality of individual processing systems report their performance data. The performance monitoring unit data can be aggregated to a monitoring system and stored in the database for analysis by a machine learning engine running on central server, for example.

As noted, the database can keep identified patterns, for example, profiles, network statistics, and so on, that are positive (or negative) indicators of malicious activity. Performance data can be mixed in different sets of scenarios, using different algorithms, for instance string searching algorithms such as Boyer-Moore, to detect pattern matching (in which a string is found and an attempt is made to find a pattern and verify if it matches something in the database). Pattern extraction and matching can use a composite of pattern characteristics, rather than a single pattern characteristic, for instance any of the following:

multi-pattern search algorithms to identify malicious activity. Example algorithms include but are not limited to: (i) Aho-Corasick using an automata approach. The automaton consumes one character from the input text each time. The character will drive the automaton to a new state which represents all of the partially matched patterns. It is used in UNIX fgrep & egrep (with -f option) and compilers, for instance; (ii) Commentz-Walter, which combines a Boyer-Moore technique with the Aho-Corasick algorithm. It is implemented in gre and GNU fgrep 2.0; (iii) Baeza-Yates, which combines a Boyer-Moore-Horspool algorithm with the Aho-Corasick algorithm; (iv) Manber-Wu, which uses the bad character heuristic of the Boyer-Moore algorithm. By noticing that the large number of patterns will decrease the chance to get bigger movement, this algorithm uses a block of characters to find a movement offset; (v) Kim-Kim, which uses compact encoding and hash to decrease the number of potential patterns; (vi) Fisk-Varghese proposed a Setwise Boyer-Moore-Horspool, and uses a bad character heuristic and suffix trie; and (vii) Coit-Staniford-McAlerney proposed Aho-Corasic-Boyer-Moore, which is similar to Setwise Boyer-Moore-Horspool, using bad character and good prefix heuristic plus prefix trie;

pattern character case sensitivity;

pattern size;

Pattern group size, for example clock cycles consumed by a processing unit (e.g. a CPU) of the processing system: For instance, an observed spike in CPU utilization but little or no apparent I/O on a thread might be indicative of malicious activity;

algorithmic attacks, where an attacker can manipulate a system by crafting an input that forces the system to consume super-linear space or time processing it. This malicious act results in legitimate users being denied service or the system becoming disabled when it is forced to attempt computations that require large amounts of space or time. Aspects described herein could track "super-linear space or time processing" as part of the algorithmic attack;

search text size;

frequency of searches, for instance how many times the enclave program accesses a database, using JDBC or other data source connection;

network statistics, for example size of TCP packet headers: For instance, packet headers larger/longer than typical or than a threshold might be indicative of malicious activity; and virtual memory behavior, for example a number of page faults: For instance, a high frequency of page faults might be indicative of malicious activity.

Thus, multiple data sources may be leveraged in the assessment of whether malicious code exists in the binary (executable). Grouping a set of characteristics exhibited by the enclave provides a better understanding whether there is malware inside of the enclave.

Accordingly, aspects described herein can profile subject code (possible malware) of a software enclave and compare the profile to a database of patterns. If there is a pattern match, the process/executing subject code may be classified as potentially or actually dangerous.

In a particular approach, an optimized full matrix state table and/or a memory efficient state table using a sparse matrix base includes pattern characteristics extracted from the machine learning. This may be leveraged in a temporal signature match. At instant 1, the executing code might exhibit one set of characteristics (has a first signature as indicated by the performance data), then at instant 2 exhibit a different set of characteristics (has a second, different signature as indicated by the performance data). Aspects described herein can observe such signatures over time. A signature at one point in time might match that of normal, benign executing code, whereas a later signature at a particular point in time indicates malicious behavior. Processes described herein can identify this by observing a trend in this 'anomaly state' of the subject code—the anomaly state being an indication of an extent to which the subject code is deemed anomalous based on the database of pattern—and ascertaining whether the trend suggests, based on historical data for instance, that the subject code is currently performing, or is likely to perform, malicious activity. Anomaly states may be represented graphically if desired, showing transitions between states of the enclave from, as an example, 'benign' to 'somewhat malicious' to 'confirmed malicious'. At each state, there may be an indication of which pattern characteristic(s) have been satisfied to support the conclusion about the subject code's maliciousness. This observation in the trend of the anomaly state can factor into a decision about whether subject code is malicious. For instance, it may factor into a confidence level that the enclave is executing malicious code.

Improvements in at least anti-malware software, safe software enclave management, and overall computer security are hereby provided by aspects described herein. Prior approaches are unable to effectively identify malicious software running in software enclaves.

Figure 5:
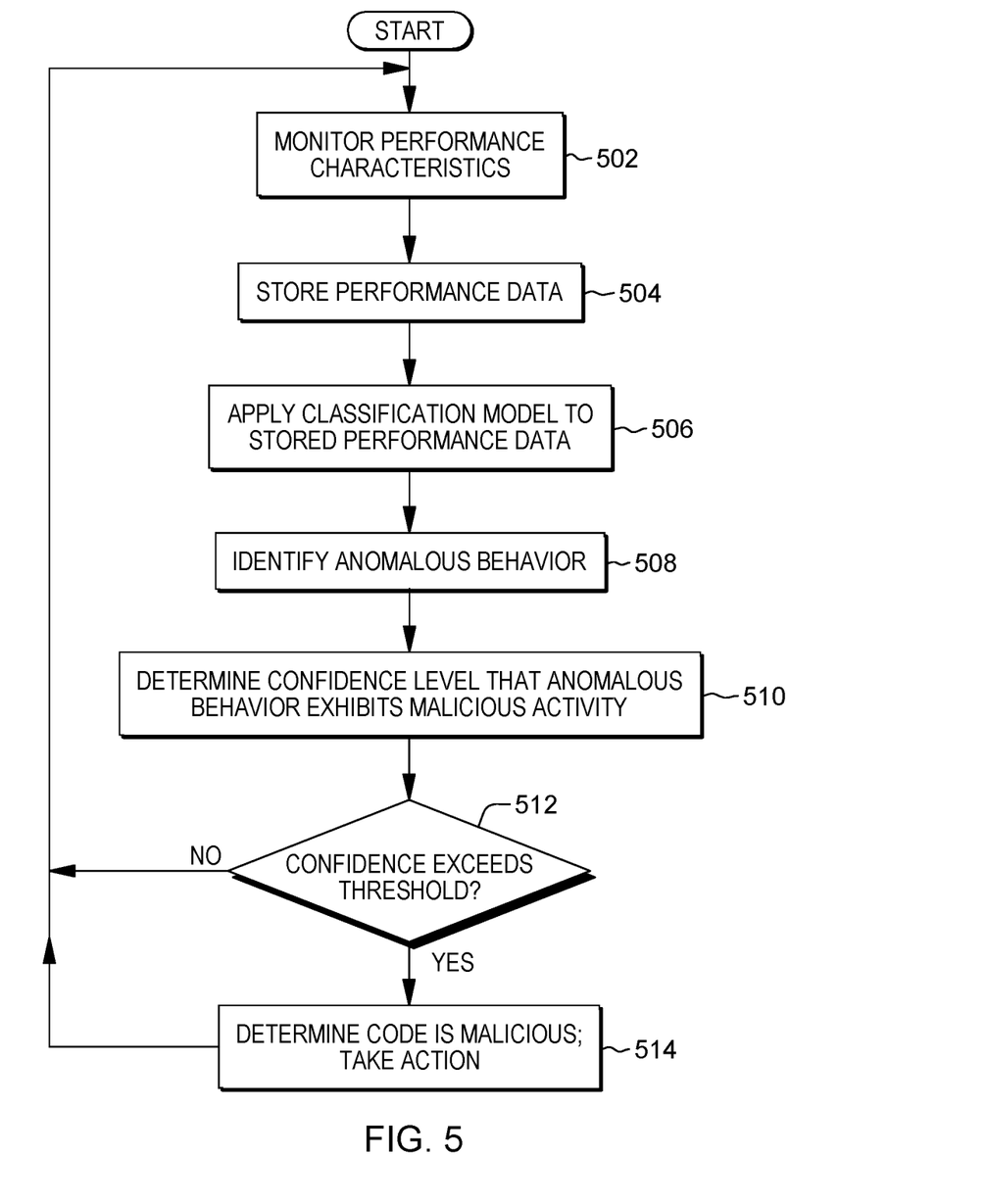
FIG. 5 depicts an example process for identifying malicious code execution of executing subject code of a software enclave of a processing system, in accordance with aspects described herein.

FIG. 5 depicts an example process for identifying malicious code execution of executing subject code of a software enclave of a processing system, in accordance with aspects described herein. In some examples, the process is performed by one or more computer systems, such as those described herein, which may include one or more user computer systems, one or more cloud/remote servers in communication with a user computer system, and/or one of more other computer systems.

The process begins by monitoring performance characteristics (502) of the processing system attributed to the execution of the subject code of the software enclave. The monitoring performance characteristics produces performance data, which can be any data produced by the monitoring and that is or may be used to classify whether the executing code is malicious. In particular examples, the monitoring includes monitoring processor performance in the execution of the subject code and producing processor performance data based on the monitoring the processor performance. Processor performance data can include processor cache hits and misses, as examples. Additionally or alternatively, the monitoring (502) includes monitoring input/output (I/O) characteristics, such as network I/O characteristics attributed to the execution of the subject code, and producing I/O performance data based on the monitoring the I/O characteristics. Monitoring I/O characteristics can include monitoring: open network ports, connections to external systems addresses, network data packet size, duration of network sessions, and/or disk usage including reads, writes, and block sizes. In yes further embodiments, monitoring the performance characteristics further includes reading operating system events and processing system hardware events to produce event data as part of the performance data.

The process of FIG. 5 continues by storing the performance data to a relational database (504). The process applies a classification model to the stored performance data to obtain an output (506), and, based on the output of the classification model, identifies anomalous behavior (508) in the execution of the subject code. The process determines a confidence level that the anomalous behavior exhibits malicious activity (510). The determined confidence level that the anomalous behavior exhibits malicious activity may be at least partially based on a determined trend in the anomaly state of the executing subject code up to a point in time. The trend can indicate that the executing subject code has, or is expected to at a future time, engage in malicious behavior. Over time, a knowledge base is built based on historic analysis of these trends in anomaly states of executing code, the knowledge base informing confidence levels that anomalous behavior exhibits malicious activity.

The process determines whether the determined confidence exceeds a threshold (512), which may be predefined or dynamically set either manually (by a user) of automatically based on any desired factors. In a particular example, the confidence threshold is 90. If at (512) it is determined that the confidence level exceeds the threshold, the process continues by determining that the executing subject code is malicious and taking action (514). An example action is initiating halting (i.e. sending a signal or request) of the execution of the subject code. Halting could be pausing and/or destroying the enclave altogether.

Then, or if it was determined at (512) that the confidence does not exceed the threshold, the process returns to 502 to iterate the performance of the monitoring the performance characteristics, storing the performance data, and applying the classification model. In some embodiments, an anomaly state of the executing subject code may be measured at each iteration of the iterating and a trend in the anomaly state of the executing subject code up to a time at which the iteration is performed is determined. Based on the trend in anomaly state, for instance the code appears more anomalous over time, this might inform that the code is malicious.

In some aspects, a process builds the classification model. This may be performed by a server or other computer system with access to collected performance data. The building includes aggregating this performance data of multiple processing systems, and performing classification of the aggregated performance data. The classification can include pattern extraction to extract patterns that indicate malicious behavior in executing software. Extracted patterns may be stored in the relational database and associated with monitored resource(s) to which the pattern correlates.

Pattern extraction can use any one or more of a plurality of pattern characteristics. For instance, they include pattern group size including clock cycles consumed by a processing unit of the processing system, network statistics including Transmission Control Protocol packet header length and trend in length over time, and/or virtual memory behavior including number of page faults, as examples.

Although various examples are provided, variations are possible without departing from a spirit of the claimed aspects.

Figure 6:
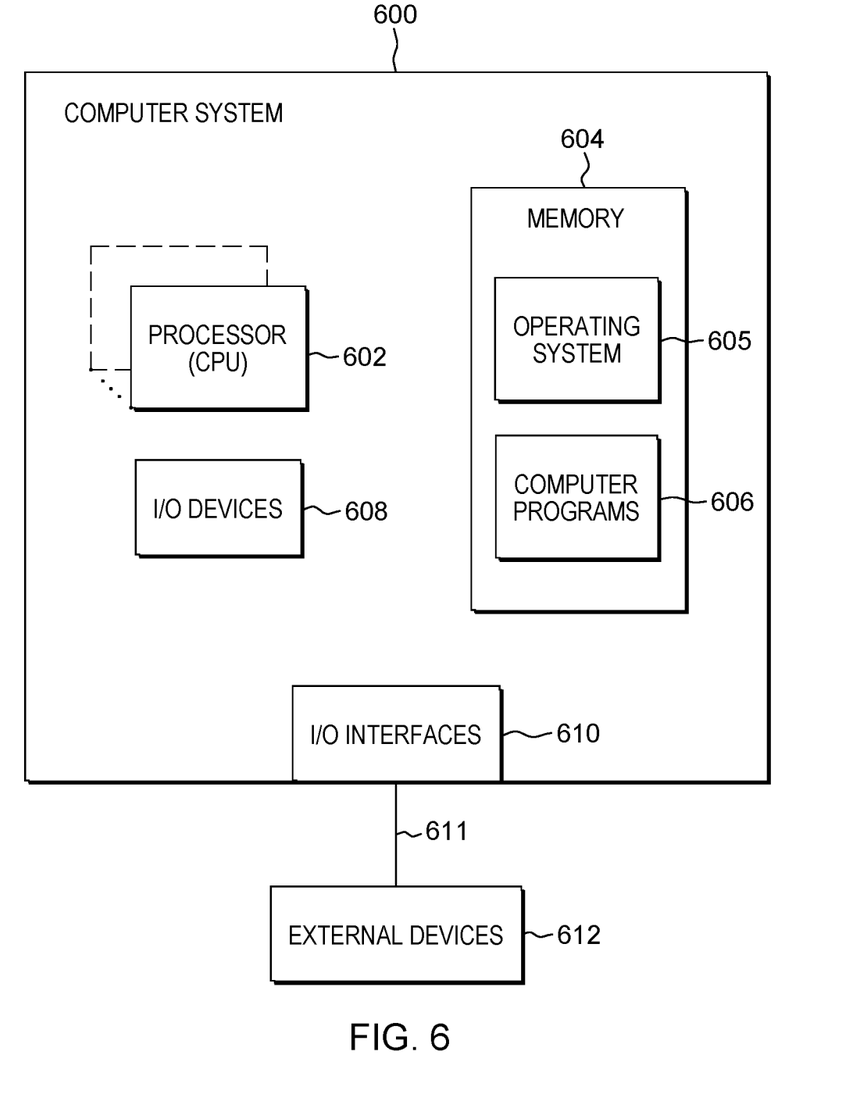
FIG. 6 depicts one example of a computer system and associated devices to incorporate and/or use aspects described herein.

Processes described herein may be performed singly or collectively by one or more computer systems. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive (s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 7.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 7:
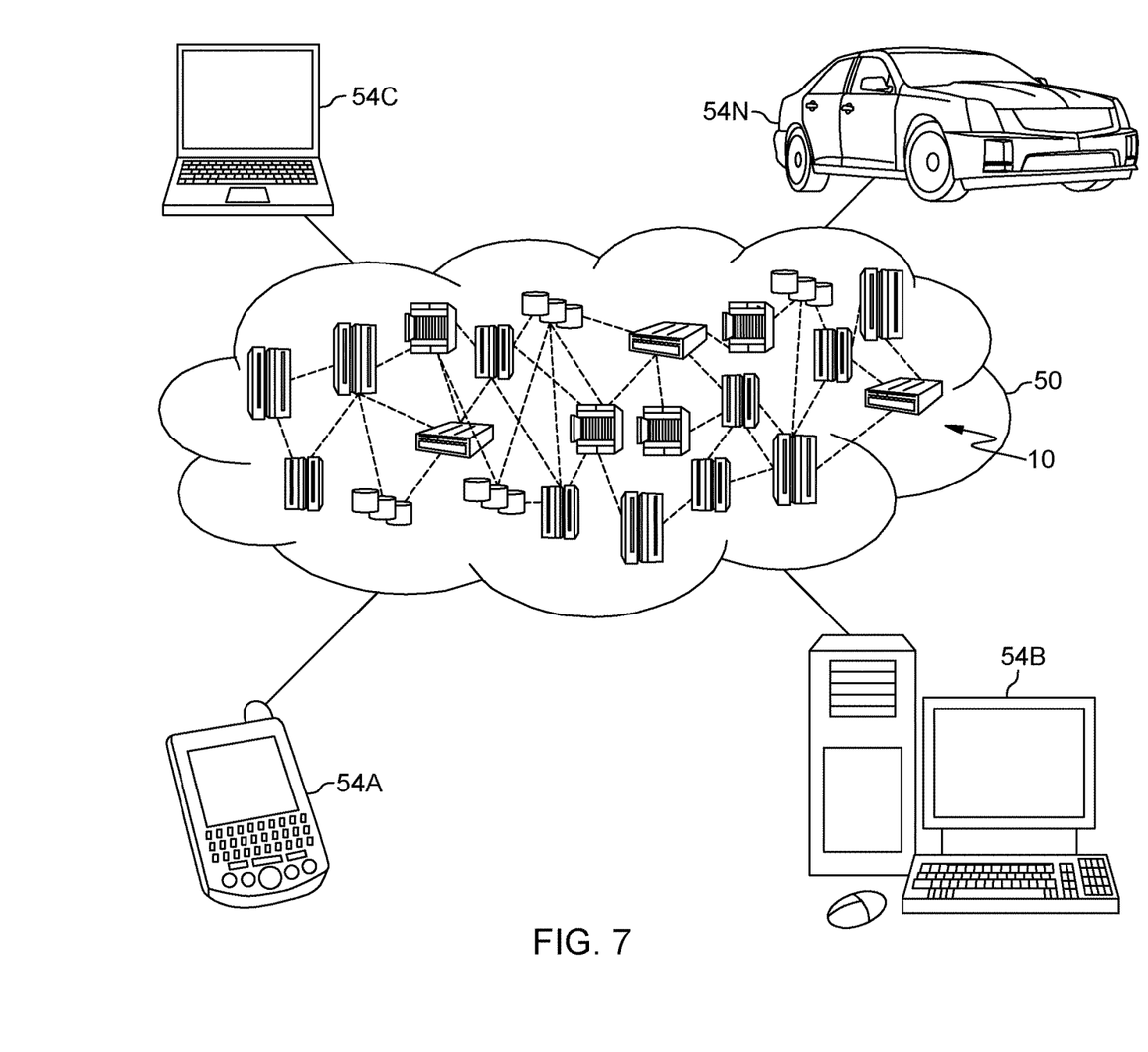
FIG. 7 depicts a cloud computing environment according to an embodiment of the present invention.

Referring now to FIG. 7, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
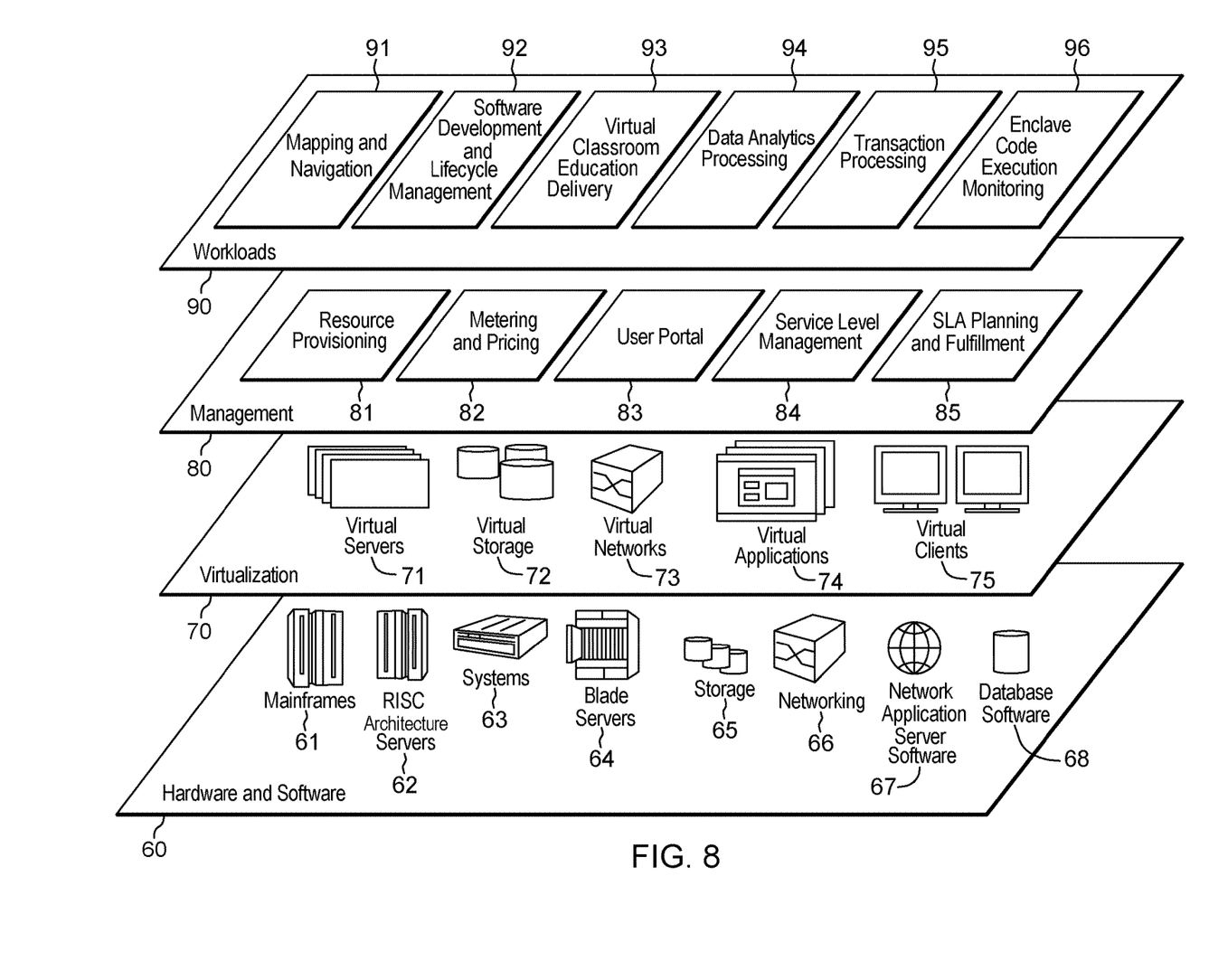
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enclave code execution monitoring 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method for identifying malicious code execution of executing subject code of a software enclave of a processing system, the computer-implemented method comprising:
    monitoring performance characteristics of the processing system attributed to the execution of the subject code of the software enclave, the monitoring performance characteristics producing performance data, and the monitoring comprising:
        monitoring processor performance in the execution of the subject code, and producing processor performance data based on the monitoring the processor performance; and
        monitoring input/output (I/O) characteristics, including network I/O characteristics, attributed to the execution of the subject code, and producing I/O performance data based on the monitoring the I/O characteristics;
    storing the performance data to a relational database;
    applying a classification model trained by machine learning to the stored performance data to obtain an output;
    iteratively performing the monitoring the performance characteristics, storing the performance data, and applying the classification model, wherein, at each iteration of the iterating, an anomaly state of the executing subject code is measured and a trend in the anomaly state of the executing subject code up to a time at which the iteration is performed is determined;
    based on the output of the classification model, identifying anomalous behavior in the execution of the subject code, and determining a confidence level that the anomalous behavior exhibits malicious activity; and
    based on the confidence level exceeding a threshold, determining that the executing subject code is malicious and initiating halting of the execution of the subject code.

2. The method of claim 1, wherein the monitoring I/O characteristics comprises monitoring at least one selected from the group consisting of: open network ports, connections to external systems addresses, network data packet size, duration of network sessions, and disk usage including reads, writes, and block sizes.

3. The method of claim 1, wherein the determined confidence level that the anomalous behavior exhibits malicious activity is at least partially based on the determined trend in the anomaly state of the executing subject code up to a point in time, wherein the trend indicates that the executing subject code has, or is expected to at a future time, engage in malicious behavior.

4. The method of claim 3, further comprising building a knowledge base based on historic analysis of trends in anomaly states of executing code, the knowledge base informing confidence levels that anomalous behavior exhibits malicious activity.

5. The method of claim 1, further comprising building the classification model, the building comprising:
    aggregating performance data of multiple processing systems; and
    performing classification of the aggregated performance data, the classification comprising pattern extraction to extract patterns that indicate malicious behavior in executing software.

6. The method of claim 5, wherein the pattern extraction uses a plurality of pattern characteristics include at least one selected from the group consisting of: pattern group size including clock cycles consumed by a processing unit of the processing system, network statistics including Transmission Control Protocol packet header length and trend in length over time, and virtual memory behavior including number of page faults.

7. The method of claim 5, wherein the extracted patterns are stored in the relational database and associated with one or more monitored resources to which the pattern correlates.

8. The method of claim 1, wherein the halting comprises destruction of the enclave.

9. The method of claim 1, wherein the monitoring the performance characteristics further comprises reading operating system events and processing system hardware events to produce event data as part of the performance data to which the classification model is applied.

10. The method of claim 1, wherein the processor performance data comprises processor cache hits and misses.

11. A computer system for identifying malicious code execution of executing subject code of a software enclave of a processing system, the computer system comprising:
   a memory; and
   a processor in communication with the memory, wherein the computer system is configured to perform a method comprising:
      monitoring performance characteristics of the processing system attributed to the execution of the subject code of the software enclave, the monitoring performance characteristics producing performance data, and the monitoring comprising:
         monitoring processor performance in the execution of the subject code, and producing processor performance data based on the monitoring the processor performance; and
         monitoring input/output (I/O) characteristics, including network I/O characteristics, attributed to the execution of the subject code, and producing I/O performance data based on the monitoring the I/O characteristics;
      storing the performance data to a relational database;
      applying a classification model trained by machine learning to the stored performance data to obtain an output;
      iteratively performing the monitoring the performance characteristics, storing the performance data, and applying the classification model, wherein, at each iteration of the iterating, an anomaly state of the executing subject code is measured and a trend in the anomaly state of the executing subject code up to a time at which the iteration is performed is determined;
      based on the output of the classification model, identifying anomalous behavior in the execution of the subject code, and determining a confidence level that the anomalous behavior exhibits malicious activity; and
      based on the confidence level exceeding a threshold, determining that the executing subject code is malicious and initiating halting of the execution of the subject code.

12. The computer system of claim 11, wherein the monitoring I/O characteristics comprises monitoring at least one selected from the group consisting of: open network ports, connections to external systems addresses, network data packet size, duration of network sessions, and disk usage including reads, writes, and block sizes.

13. The computer system of claim 11, wherein the determined confidence level that the anomalous behavior exhibits malicious activity is at least partially based on the determined trend in the anomaly state of the executing subject code up to a point in time, wherein the trend indicates that the executing subject code has, or is expected to at a future time, engage in malicious behavior.

14. The computer system of claim 13, wherein the method further comprises building a knowledge base based on historic analysis of trends in anomaly states of executing code, the knowledge base informing confidence levels that anomalous behavior exhibits malicious activity.

15. The computer system of claim 11, wherein the halting comprises destruction of the enclave.

16. A computer program product for identifying malicious code execution of executing subject code of a software enclave of a processing system, the computer program product comprising:
   a computer readable storage medium readable by a processing circuit and storing instructions for execution by the processing circuit for performing a method comprising:
      monitoring performance characteristics of the processing system attributed to the execution of the subject code of the software enclave, the monitoring performance characteristics producing performance data, and the monitoring comprising:
         monitoring processor performance in the execution of the subject code, and producing processor performance data based on the monitoring the processor performance; and
         monitoring input/output (I/O) characteristics, including network I/O characteristics, attributed to the execution of the subject code, and
      producing I/O performance data based on the monitoring the I/O characteristics;
      storing the performance data to a relational database;
      applying a classification model trained by machine learning to the stored performance data to obtain an output;
      iteratively performing the monitoring the performance characteristics, storing the performance data, and applying the classification model, wherein, at each iteration of the iterating, an anomaly state of the executing subject code is measured and a trend in the anomaly state of the executing subject code up to a time at which the iteration is performed is determined;
      based on the output of the classification model, identifying anomalous behavior in the execution of the subject code, and determining a confidence level that the anomalous behavior exhibits malicious activity; and
      based on the confidence level exceeding a threshold, determining that the executing subject code is malicious and initiating halting of the execution of the subject code.

17. The computer program product of claim 16, wherein the monitoring I/O characteristics comprises monitoring at least one selected from the group consisting of: open network ports, connections to external systems addresses, network data packet size, duration of network sessions, and disk usage including reads, writes, and block sizes.

18. The computer program product of claim 16, wherein the determined confidence level that the anomalous behavior exhibits malicious activity is at least partially based on the determined trend in the anomaly state of the executing subject code up to a point in time, wherein the trend indicates that the executing subject code has, or is expected to at a future time, engage in malicious behavior.

19. The computer program product of claim 18, wherein the method further comprises building a knowledge base based on historic analysis of trends in anomaly states of executing code, the knowledge base informing confidence levels that anomalous behavior exhibits malicious activity.

* * * * *